US012412494B2

(12) United States Patent
Kim et al.

(10) Patent No.: US 12,412,494 B2
(45) Date of Patent: Sep. 9, 2025

(54) DISPLAY DEVICE INCLUDING OVERLOAD PROTECTION CIRCUIT

(71) Applicant: SAMSUNG ELECTRONICS CO., LTD., Suwon-si (KR)

(72) Inventors: Jaeeun Kim, Suwon-si (KR); Sungyong Joo, Suwon-si (KR); Jiwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/403,923

(22) Filed: Jan. 4, 2024

(65) Prior Publication Data

US 2024/0135845 A1 Apr. 25, 2024
US 2024/0233589 A9 Jul. 11, 2024

Related U.S. Application Data

(63) Continuation of application No. 17/052,053, filed as application No. PCT/KR2019/003500 on Mar. 26, 2019, now Pat. No. 11,915,628.

(30) Foreign Application Priority Data

May 4, 2018 (KR) ........................ 10-2018-0052020

(51) Int. Cl.
*G09G 3/00* (2006.01)
*G09G 5/10* (2006.01)

(52) U.S. Cl.
CPC ............... *G09G 3/006* (2013.01); *G09G 5/10* (2013.01); *G09G 2330/025* (2013.01); *G09G 2330/04* (2013.01)

(58) Field of Classification Search
None
See application file for complete search history.

(56) References Cited

U.S. PATENT DOCUMENTS 7,502,950 B1 * 3/2009 Brands .................. G06F 3/1446 713/340
8,009,137 B2 8/2011 Heo
(Continued)

FOREIGN PATENT DOCUMENTS

JP 2017-163176 9/2017
JP 10-1797523 11/2017
(Continued)

OTHER PUBLICATIONS

International Search Report dated Jul. 19, 2019 from International Application No. PCT/KR2019/003500, 4 pages.
(Continued)

*Primary Examiner* — Andre L Matthews
(74) *Attorney, Agent, or Firm* — STAAS & HALSEY LLP

(57) ABSTRACT

A display device according to an embodiment includes a display, a first power module that outputs a first power, and a second power module that outputs a second power. The first power and the second power are supplied to the display. The first power module is configured to cut off the first power when an amount of input current exceeds an overload criterion, to identify whether the second power module is abnormal based on the second power, and to change the overload criterion from a first threshold current amount to a second threshold current amount that exceeds the first threshold current amount, in an abnormal state of the second power module.

16 Claims, 14 Drawing Sheets

(56) References Cited

U.S. PATENT DOCUMENTS

| | | | |
|---|---|---|---|
| 8,850,246 | B2 | 9/2014 | Lee et al. |
| 9,392,653 | B2 | 7/2016 | Lee et al. |
| 9,511,784 | B2 | 12/2016 | Oki et al. |
| 9,720,638 | B2 | 8/2017 | Joo et al. |
| 10,274,987 | B2 | 4/2019 | Puggelli et al. |
| 2011/0141776 | A1 | 6/2011 | Lin |
| 2012/0299941 | A1 | 11/2012 | Lee |
| 2013/0088803 | A1 | 4/2013 | Kim et al. |
| 2017/0063149 | A1 | 3/2017 | Castillo |
| 2017/0201122 | A1 | 7/2017 | Arduini et al. |
| 2017/0272025 | A1 | 9/2017 | Jimbo et al. |
| 2017/0300079 | A1 | 10/2017 | Puggelli et al. |
| 2017/0331295 | A1 | 11/2017 | Abeyasekera et al. |
| 2017/0338609 | A1 | 11/2017 | Holzherr |

FOREIGN PATENT DOCUMENTS

| | | |
|---|---|---|
| KR | 10-2013-0037486 | 4/2013 |
| KR | 10-2013-0049049 | 5/2013 |
| KR | 10-2016-0016413 | 2/2016 |
| KR | 10-2008-0079449 | 9/2018 |
| WO | WO2013/128585 | 9/2013 |

OTHER PUBLICATIONS

Office Action dated May 12, 2022 in U.S. Appl. No. 17/052,053.
Advisory Action dated Jan. 27, 2023 in U.S. Appl. No. 17/052,053.
Advisory Action dated Mar. 3, 2023 in U.S. Appl. No. 17/052,053.
Office Action dated Dec. 19, 2022 in Korean Patent Application No. 10-2018-0052020 (6 pages; 8 pages English translation).
Office Action dated Apr. 6, 2023 in U.S. Appl. No. 17/052,053.
Notice of Allowance dated Oct. 13, 2023 in U.S. Appl. No. 17/052,053.
Office Action dated Dec. 21, 2023 in Korean Patent Application No. 10-2023-0044371.
Office Action dated Nov. 22, 2022 in U.S. Appl. No. 17/052,053.
U.S. Appl. No. 17/052,053, filed Oct. 30, 2020, Jaeeun Kim et al., Samsung Electronics Co., Ltd.

* cited by examiner

DISPLAY DEVICE INCLUDING OVERLOAD PROTECTION CIRCUIT

CROSS-REFERENCE TO RELATED APPLICATIONS

This application is a continuation application of U.S. patent application Ser. No. 17/052,053 filed on Oct. 30, 2020, which is a U.S. National Stage Application which claims the benefit under 35 U.S.C. § 371 of International Patent Application No. PCT/KR2019/003500 filed on Mar. 26, 2019, which claims foreign priority benefit under 35 U.S.C. § 119 of Korean Patent Application No. 10-2018-0052020 filed on May 4, 2018 in the Korean Intellectual Property Office, the contents of all of which are incorporated herein by reference.

TECHNICAL FIELD

Embodiments disclosed in the disclosure relate to a power module implementation technology of a display device.

BACKGROUND ART

A large-screen display device including a large display (e.g., a display of 400 inches or more) is often installed in public places (e.g., theaters). Such a large display may be formed by combining a plurality of small displays. Since a display device including the large display is used for a long time, failures are likely to occur.

Each display module of the large-screen display device may include a dual power module. Accordingly, even if a failure occurs in one power module, the each display module may be driven using power of another power module. For example, the large-screen display device may include a first power module that supplies power to small displays of a first block (e.g., a left half) and a second power module that supplies power to small displays of a second block (e.g., a right half) among a plurality of small displays. Since an output terminal of the first power module and an output terminal of the second power module are interconnected (load share), when one of the first power module and the second power module fails, the plurality of small displays may receive power from the other.

DISCLOSURE

Technical Problem

Since a first power module and a second power module of the large-screen display device are each implemented to cover the rating of the large-screen display device (all a plurality of small displays), a volume of each of the power modules is large and a manufacturing cost may increase.

Various embodiments disclosed in the disclosure provide a display device including an overload prevention circuit capable of reducing the rating of a power module.

In addition, various embodiments disclosed in the disclosure provide a display device capable of stably supplying power even in an environment in which some of a plurality of power modules can supply power.

Technical Solution

A display device according to an embodiment disclosed in the disclosure includes a display, a first power module that outputs a first power, and a second power module that outputs a second power, wherein the first power and the second power are supplied to the display, and the first power module is configured to cut off the first power when an amount of input current exceeds an overload criterion, to identify whether the second power module is abnormal based on the second power, and to change the overload criterion from a first threshold current amount to a second threshold current amount that exceeds the first threshold current amount, in an abnormal state of the second power module.

In addition, a display device according to an embodiment disclosed in the disclosure includes a display, a first power module that outputs a first power, a second power module that outputs a second power, and a processor, wherein the first power and the second power are supplied to the display, wherein the processor is configured to sense an abnormal state of the second power module, based on the second power, and to reduce a luminance of the display to less than a threshold luminance, in the abnormal state of the second power module, and wherein the first power module is configured to cut off an output of the first power when an output current amount of the first power module exceeds a threshold current amount corresponding to a state in which the luminance of the display is the threshold luminance.

Advantageous Effects

According to the embodiments disclosed in the disclosure, it is possible to reduce the rated power of the power module. In addition to this, various effects that are directly or indirectly identified through the disclosure may be provided.

DESCRIPTION OF DRAWINGS

In connection with the description of the drawings, the same or similar reference numerals may be used for the same or similar components.

MODE FOR INVENTION

Hereinafter, various embodiments of the disclosure will be described with reference to the accompanying drawings. However, this is not intended to limit the disclosure to specific embodiments, and it should be understood that the disclosure includes various modifications, equivalents, and/or alternatives.

Figure 1:
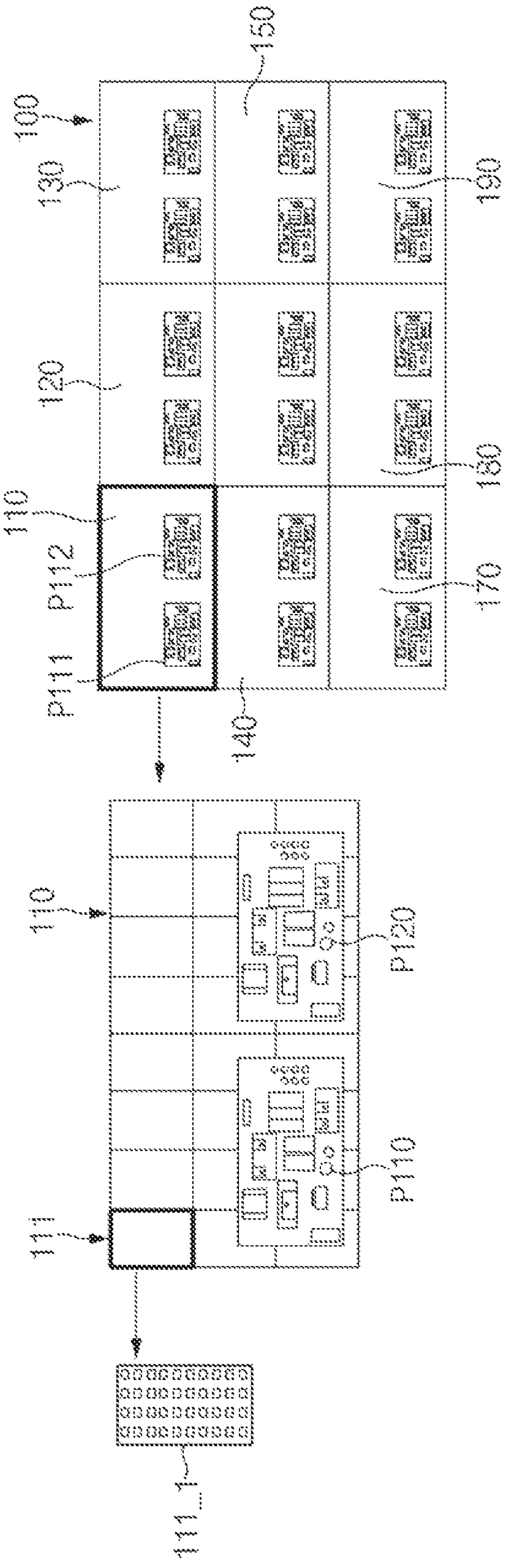
FIG. 1 illustrates a structural diagram of a large-screen display device according to an embodiment.

FIG. 1 illustrates an example of a structural diagram of a large-screen display device according to an embodiment.

Referring to FIG. 1, according to an embodiment, a large-screen display system 100 may include a plurality of display devices 110, 120, 130, 140, 150, 160, 170, 180, and 190. Each of the display devices (e.g., 110, 120, 130, 140, 150, 160, 170, 180, and 190) may include a first power module P111 and a second power module P112. The first power module P111 and the second power module P112 have (load share) output terminals connected to each other, and may share power consumption of each of the display devices (e.g., 110, 120, 130, 140, 150, 160, 170, 180, and 190). For example, when the rated power of the display device (e.g., 110) is 200 W, the first power module P111 and the second power module P112 may each share 100 W of power consumption. In addition, when a failure occurs in one of the first power module P111 and the second power module P112, the other, in which the failure does not occur, may supply power to the display device (e.g., 110).

According to an embodiment, each display device (e.g., 110) may include a plurality of display modules (e.g., 111). Each of the display modules 111 may include, for example, a plurality of LEDs (e.g., 111_1), and each LED 111_1 may constitute a unit pixel of the display module (e.g., 111). Each of the display modules (e.g., 111) may be, for another example, a single display module including a plurality of pixels (e.g., 111_1).

Figure 2:
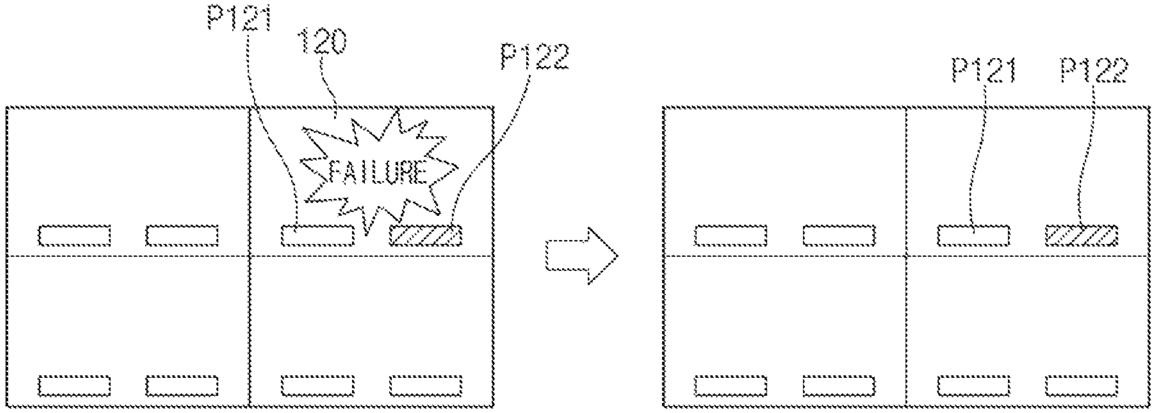
FIG. 2 is a diagram illustrating an exemplary power supply when a failure occurs in a first power module, according to an embodiment.

FIG. 2 is a diagram illustrating an exemplary power supply when a failure occurs in a first power module, according to an embodiment.

Referring to FIG. 2, a first power module P121 and a second power module P122 of the display device 120 (e.g., 120 of FIG. 1) may share a load. For example, outputs of the first power module P121 and the second power module P122 are connected in parallel to each other to supply power to the display of the same display device. To this end, the rated power of the first power module P121 and the second power module P122 may be more than half of the rated power of the display device (e.g., 120). For example, when the rated power of the display device (e.g., 120) is 400 W, the first power module P121 and the second power module P122 may each be configured to have a rated power of 200 W or more.

When a failure occurs in the first power module P121, as the second power module P122 supplies power to the display device (e.g., 120), a consumer may not be able to recognize an occurrence of the failure of the display device (e.g., 120).

Figure 3:
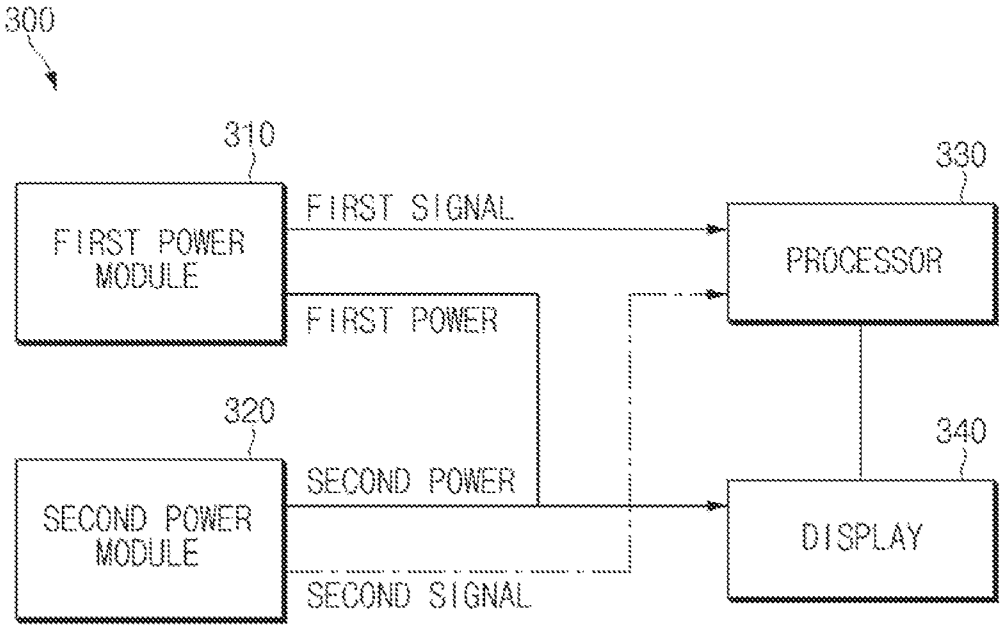
FIG. 3 illustrates a configuration diagram of a display device according to an embodiment.

FIG. 3 illustrates a configuration diagram of a display device according to an embodiment.

Referring to FIG. 3, a display device 300 (e.g., the display device 110 of FIG. 1) may include a display 340 (e.g., a plurality of display modules (e.g., 111) of FIG. 1), and a processor 330, a first power module 310, and a second power module 320.

According to an embodiment, the display 340 may receive output power (first power and second power) of the first power module 310 and the second power module 320, and may be driven using the received power. The display 340 may be driven using the received power, and may output an image under control of the processor 330.

According to an embodiment, the processor 330 may execute an operation or a data processing related to control and/or communication of at least one other components of the display device 300. The processor 330 may include, for example, at least one of a central processing unit (CPU), a graphics processing unit (GPU), a microprocessor, an application processor, an application specific integrated circuit (ASIC), and a field programmable gate arrays (FPGA), and may have a plurality of cores.

According to an embodiment, the processor 330 may determine whether the first power module 310 is abnormal, based on output power (hereinafter, referred to as a 'first power') of the first power module 310. For example, the processor 330 may determine that the first power module 310 is in an abnormal state when a first signal generated from the first power is less than or equal to a first threshold value. In addition, the processor 330 may determine whether the second power module 320 is abnormal, based on output power (hereinafter, referred to as a 'second power') of the second power module 320. For example, the processor 330 may determine that the second power module 320 is in the abnormal state when a second signal generated from the second power is less than or equal to the first threshold value. In an embodiment, the processor 330 may control the display 340 such that the luminance of the display 340 becomes less than or equal to a threshold luminance when the abnormal state of the first power module 310 or the second power module 320 is identified.

According to an embodiment, the first power module 310 may receive external power from an external power source, and may output the first power (e.g., 200 W) that is generated by rectifying the received external power, converting the rectified power into DC power, and down-converting a level of the DC power. The second power module 320 may receive the external power from the external power source, and may output the second power (e.g., 200 W) that is generated by rectifying the received external power, converting the rectified power into DC power, and down-converting a level of the DC power. The output power of the first power module 310 and the second power module 320 may be interconnected and transmitted to the display 340. Accordingly, in a normal state, the display 340 may receive 200 W power from the first power module 310 and 200 W power from the second power module 320.

According to an embodiment, the first power module 310 (a first sensing circuit 317 of FIG. 4) may change an overload criterion of the first power module 310 in response to the normal state or the abnormal state of the second power module 320. For example, when the second power module 320 is in the normal state, an output of the first power module 310 may be cut off based on a first threshold current amount (initial overload criterion 200 W).

When the second power module 320 is in the abnormal state, the first power module 310 (the first sensing circuit 317 of FIG. 4) may change the overload criterion (e.g., change the first threshold current amount to a second threshold current amount). As the overload criterion is changed in the abnormal state of the second power module 320, when an input current amount of the first power module 310 exceeds the second threshold current amount, a circuit of the first power module 310 may be configured such that the output of the first power module 310 is cut off. The first threshold current amount may be, for example, the rated current of the first power module 310, and the second threshold current amount (e.g., 400 W) (>the first threshold current amount) may be, for example, a maximum limit current amount of the first power module 310. The maximum limit current amount may be, for example, less than or equal to a maximum current amount at which the first power module 310 normally drives the display 340 for a first specified time. The first specified time may correspond to, for example, a time required for the processor 330 to identify the abnormal state of the second power module 320 and to reduce the luminance of the display 340.

According to an embodiment, the second power module 320 (refer to the first sensing circuit 317 in FIG. 4) may change the overload criterion of the second power module 320 in response to the normal state or the abnormal state of the first power module 310. For example, when the first power module 310 is in the normal state, the output of the second power module 320 may be cut off based on a third threshold current amount (initial overload criterion 200 W). When the first power module 310 is in the abnormal state, the second power module 320 (refer to the first sensing circuit 317 in FIG. 4) may change the overload criterion (e.g., change the first threshold current amount to the second threshold current amount). As the overload criterion is changed in the abnormal state of the first power module 310, when the input current amount of the second power module 320 exceeds a fourth threshold current amount, a circuit of the first power module 310 may be configured such that the output of the second power module 320 is cut off.

The third threshold current amount may be, for example, the rated current (e.g., 200 W) of the second power module 320. The fourth threshold current amount (>the third threshold current amount) may be, for example, a maximum limit current amount (e.g., 400 W) of the second power module 320. The maximum limit current amount may be, for example, a maximum current amount at which the second power module 320 normally drives the display 340 for the first specified time.

According to various embodiments, the first power module 310 may identify the abnormal state of the second power module 320, based on the first power. For example, the first power module 310 (refer to load resistors R73 and R74 and a comparator U73 in FIG. 7) may identify that the second power module 320 is in the abnormal state when a voltage among the first power is equal to or greater than a specified voltage. The first power module 310 (a controller U1 in FIG. 7), when it is identified that the luminance of the display 340 is not reduced in a state in which the output power of the first power module 310 is increased due to the abnormal state of the second power module 320, may be provided to cut off (e.g., power off of the first power module 310) the output of the first power module 310. For example, the first power module 310 may include a load resistor (the load resistors R73 and R74 in FIG. 7) that is connected in series to the output of the first power module 310, and a comparator (U73 of FIG. 7) that outputs a specified signal (e.g., a high level signal) when a voltage across the load resistor exceeds a specified voltage corresponding to a fifth threshold current amount. In addition, the first power module 310 may include a delay element (a delay element C71 in FIG. 7) that delays the output of the comparator by a second specified time (>the first specified time), and a controller (the controller U1 of FIG. 7) that is provided to cut off the output of the first power module 310 (power off of the first power module 310), based on a signal corresponding to the output of the comparator.

The fifth threshold current amount may be, for example, a current consumption amount (e.g., corresponding to the maximum power consumption) of the display device 300 corresponding to a state in which the luminance of the display 340 is the threshold luminance. When a failure of the second power module 320 occurs, an output current amount of the first power module 310 may increase, and a voltage across the load resistor may be equal to or greater than a specified voltage. The controller may receive a signal corresponding to the specified signal after the second specified time from a time when the voltage corresponding to the output current amount is equal to or greater than the specified voltage due to the delay element. Accordingly, when the luminance of the display 340 is reduced as the processor 330 senses an abnormality in the second power module 320 after the time when the voltage across the load resistor is equal to or greater than the specified voltage, the controller may not receive a signal corresponding to the specified signal. In contrast, when the processor 330 senses the abnormality in the second power module 320 and fails to reduce the luminance of the display 340, the controller may receive the signal corresponding to the specified signal after the second specified time from the time when the voltage across the load resistor is equal to or greater than the specified voltage, and thus the controller may cut off the output of the first power module 310.

Figure 4:
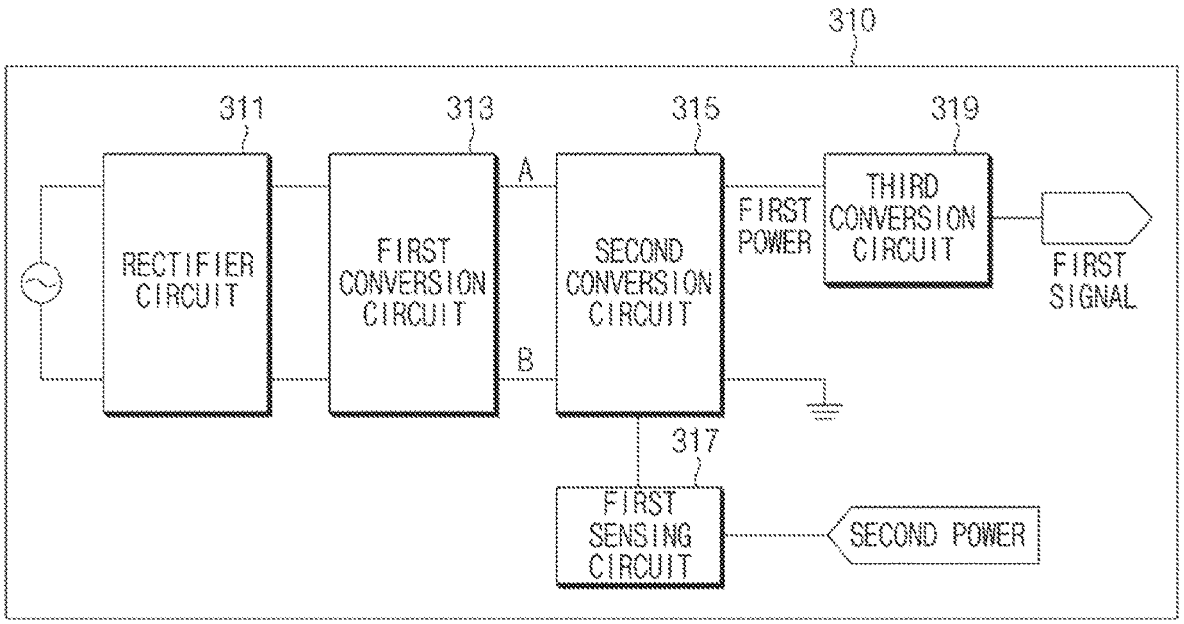
FIG. 4 illustrates a configuration diagram of a first power module including a first sensing circuit according to an embodiment.

FIG. 4 illustrates a configuration diagram of a first power module including a first sensing circuit according to an embodiment.

Referring to FIG. 4, the first power module 310 (e.g., the first power module 310 of FIG. 3) may include a rectifier circuit 311, a first conversion circuit 313, a second conversion circuit 315, and the first sensing circuit 317.

According to an embodiment, the rectifier circuit 311 may receive AC power from the external power source and may full-wave rectify the received AC power. For example, the rectifier circuit 311 may include a bridge full-wave rectifier circuit.

According to an embodiment, the first conversion circuit 313 may compensate for the power factor of the output power of the rectifier circuit 311 and may convert AC into DC. The first conversion circuit 313 may include an active power factor compensation circuit. For example, the first conversion circuit 313 may boost the received power such that a magnitude of the output voltage of the first conversion circuit 313 is within a specified range (e.g., $390 \leq 395V \leq 400V$). The first conversion circuit 313 may include, for example, at least one active power factor compensation circuit among a continuous conduction mode (CCM), a critical conduction mode (CRM), and an interleaved CRM.

According to an embodiment, the first sensing circuit 317 may sense the abnormal state of the second power module 320, based on the second power. The first sensing circuit 317 may sense the input current amount of the second conversion circuit 315 and may output a voltage (hereinafter, referred to as a 'monitoring voltage') corresponding to the sensed input current amount. The first sensing circuit 317 may differently output the monitoring voltage corresponding to the input current amount of the second conversion circuit 315 depending on whether the second power module 320 is abnormal. For example, in the normal state of the second power module 320, the first sensing circuit 317 may output the monitoring voltage that is 'N' ('N' is a prime number) times the input current amount of the second conversion circuit 315. For another example, when the second power module 320 is in the abnormal state, the first sensing circuit 317 may output the monitoring voltage of N/2 times the input current amount of the second conversion circuit 315. Accordingly, the first sensing circuit 317 may support changing the overload criterion of the second conversion circuit 315 depending on whether the second power module 320 is abnormal.

According to an embodiment, the second conversion circuit 315 may output power obtained by performing down-level conversion of power converted to DC by the first conversion circuit 313. The output current amount of the second conversion circuit 315 may be adjusted based on a current amount consumption of a load circuit (e.g., a display) connected to the output terminal of the second conversion circuit 315. For example, the second conversion circuit 315 (e.g., a control circuit) may include a feedback circuit (not illustrated), and may sense the current amount consumed by the load circuit through the feedback circuit. The second conversion circuit 315 (e.g., the control circuit) may adjust the output current amount of the second conversion circuit 315 such that the output current amount of the second conversion circuit 315 corresponds to the sensed current consumption amount. The second conversion circuit 315 may be configured to isolate a primary side from a secondary side. For example, the second conversion circuit 315 may include a half bridge LLC resonant converter or a flyback converter including at least one transformer.

According to an embodiment, the second conversion circuit 315 may receive the monitoring voltage through the first sensing circuit 317 and may cut off the output of the second conversion circuit 315, based on the monitoring voltage. For example, the second conversion circuit 315 may receive the monitoring voltage corresponding to the input current amount of the second conversion circuit 315 in the normal state of the second power module 320, and may cut off the output of the first power module 310 when the monitoring voltage exceeds a second threshold level. As described above, in the abnormal state of the second power module 320, since the first sensing circuit 317 outputs the monitoring voltage corresponding to about ½ times the normal state of the first power module 310, the second conversion circuit 315 may change the overload criterion of the second conversion circuit 315 from the first threshold current amount to the second threshold current amount in the abnormal state of the second power module 320 due to the first sensing circuit 317. For example, when the second power module 320 is in the normal state and the current amount sensed through the first sensing circuit 317 exceeds the first threshold current amount, the second conversion circuit 315 may cut off the output of the second conversion circuit 315. In addition, when the second power module 320 is in the abnormal state and the current amount sensed through the first sensing circuit 317 exceeds the second threshold current amount, the second conversion circuit 315 may cut off the output of the second conversion circuit 315.

According to an embodiment, a third conversion circuit 319 may generate the first signal by level down-converting the first power. The first signal may be transferred to the processor 330, and the processor 330 may determine whether the first power module 310 is abnormal, based on the first signal.

According to the above-described embodiment, in case of the abnormal state of the second power module 320, as the first power module 310 changes the overload criterion of the first power module 310, the first power module 310 may output driving power of the display device 300, at least until the luminance of the display 340 is reduced, on behalf of the second power module 320. According to various embodiments, the second power module 320 may identify the abnormal state of the first power module 310 in the same or similar manner as the first power module 310, and may change the overload criterion of the second power module 320 when the first power module 310 is in the abnormal state.

Figure 5:
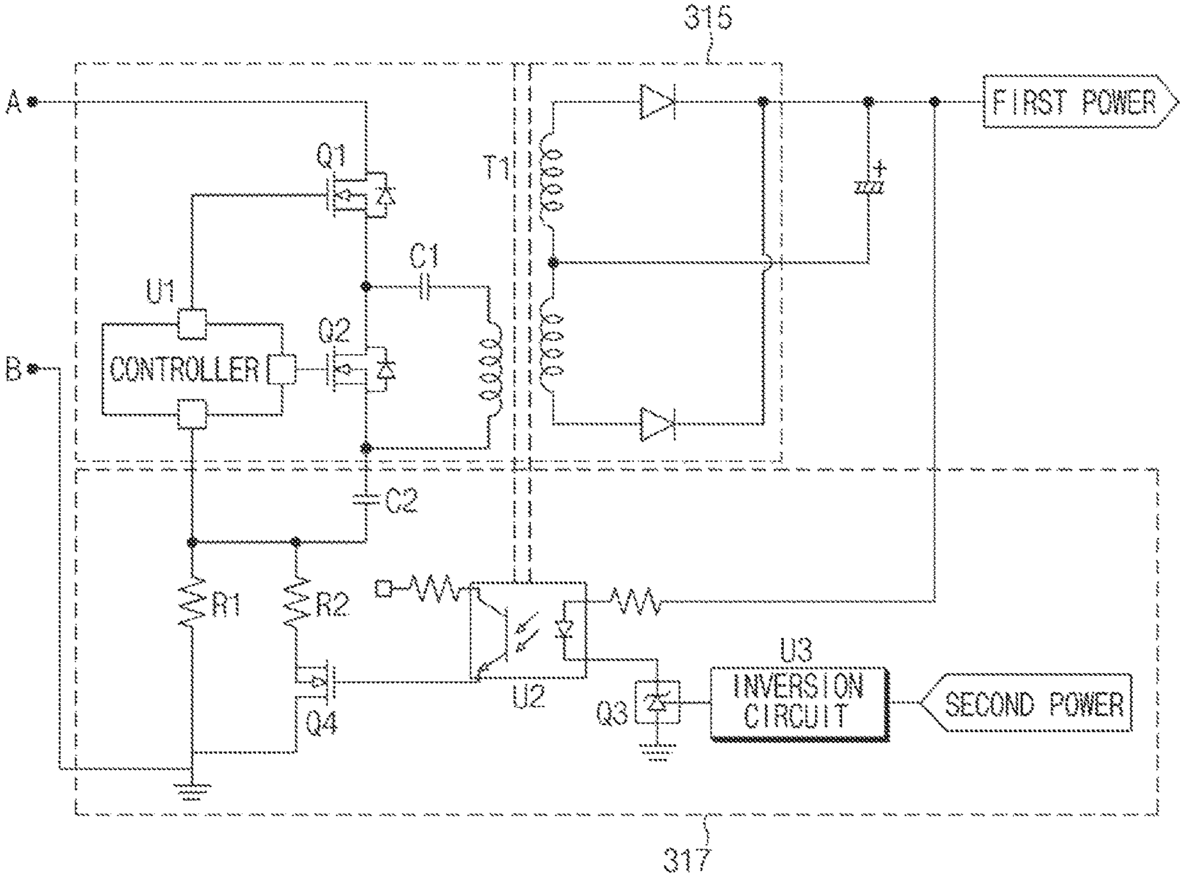
FIG. 5 illustrates a detailed circuit diagram of a first sensing circuit and a second conversion circuit according to an embodiment.

FIG. 5 illustrates a detailed circuit diagram of a first sensing circuit and a second conversion circuit according to an embodiment.

Referring to FIG. 5, the second conversion circuit 315 (e.g., the second conversion circuit 315 of FIG. 4) may include a first switching element Q1, a second switching element Q2, a transformer T1, a first capacitor C1, and the controller U1. The first sensing circuit 317 may include a photo coupler U2, a first resistor R1, a second resistor R2, a second capacitor C2, a fourth switching element Q4, and an inversion circuit U3. In an embodiment, some components may be omitted or additional components may be further included. In an embodiment, some of the components are combined to form a single entity, but functions of the corresponding components before the combination may be performed in the same manner.

The first switching element Q1 and the second switching element Q2 may each include a first field effect transistor (FET) and a second FET. When the first FET is turned on under the control of the controller U1, the first FET may output the input power supplied to a drain to a source. When the second switching element Q2 is turned on under the control of the controller U1, the second switching element Q2 may output the input power supplied to a drain to a source. The drain of the first FET may be connected to an input terminal of the second conversion circuit 315, and the source of the first FET may be connected to the primary side of the transformer T1 through the drain of the second FET and the first capacitor C1. The source of the second FET may be connected to an input terminal of the first sensing circuit 317.

According to an embodiment, the transformer T1 may receive the output of the first conversion circuit 313 through the first switching element Q1. The transformer T1 may adjust the voltage received through the first switching element Q1 to a level downward, based on a turns ratio of the primary and secondary windings, and may convert a current amount received through the first switching element Q1 into a current amount based on the turns ratio and may output the conversion result.

The inversion circuit U3 may receive the second power (e.g., a second voltage) and may output the monitoring signal corresponding to the second power. The monitoring signal may be a signal obtained by inverting the second voltage. The monitoring signal may exceed a third threshold level (e.g., 2.5V) when the second voltage is a low state, and may be less than or equal to the third threshold level when the second voltage is the high level.

A first terminal of a third switching element Q3 and a second terminal of the third switching element Q3 may be opened or shorted depending on the magnitude of the voltage applied to a third terminal of the third switching element Q3. Since the third terminal of the third switching element Q3 receives the monitoring signal, the first terminal of the third switching element Q3 and the second terminal of the third switching element Q3 may be opened or shorted depending on the magnitude of the monitoring signal. When the monitoring signal is less than or equal to the third threshold level, the first terminal of the third switching element Q3 and the second terminal of the third switching element Q3 may be opened. When the monitoring signal exceeds the third threshold level, the first terminal of the third switching element Q3 and the second terminal of the third switching element Q3 may be shorted. Since the first terminal of the third switching element Q3 is in a pull-up state, and the second terminal of the third switching element Q3 is connected to a ground, when the monitoring signal exceeds the third threshold level, the first terminal and the second terminal of the third switching element Q3 may be changed to the low state. The third switching element Q3 may be, for example, 'TL431'.

The photo coupler U2 may be electrically connected between the first terminal of the third switching element Q3 and the control terminal (a gate) of the fourth switching element Q4. The photo coupler U2 transfers a signal applied to the first terminal (output terminal) of the third switching element Q3 to the control terminal of the fourth switching element Q4, but may electrically isolate between the first terminal of the third switching element Q3 and the control terminal of the fourth switching element Q4. For example, an anode of a light emitting diode of the photo coupler U2 may be connected to the output voltage of the second conversion circuit 315, and a cathode of the light emitting diode of the photo coupler U2 may be connected to the first terminal of the third switching element Q3. A collector of a transistor of the photo coupler U2 may be connected to a voltage generated from the input power of the transformer T1, and an emitter of the photo coupler U2 may be connected to the control terminal of the fourth switching element Q4.

The second capacitor C2 may receive at least a part of an output current of the primary winding of the transformer T1, and may couple the DC from the received current.

A first terminal of the first resistor R1 may be connected to a first terminal of the second resistor R2, a second terminal of the second capacitor C2, and a first input terminal of the controller U1, and a second terminal of the resistor R1 may be connected to the ground. A first terminal of the second resistor R2 may be connected to the first terminal of the first resistor R1, a second terminal of the second capacitor C2, and the first input terminal of the controller U1, and a second terminal of the second resistor R2 may be connected to the ground through the fourth switching element Q4. The first resistor R1 and the second resistor R2 may convert the output current of the primary winding of the transformer T1 into a voltage corresponding to an output current amount of the primary winding.

The fourth switching element Q4 may include a third FET. A drain of the third FET may receive at least a part of the primary side current of the transformer T1 through the second capacitor C2, and a source of the third FET may be connected to the ground. A gate of the third FET may receive a signal corresponding to the monitoring signal through the third switching element Q3 and the photo coupler U2. The signal corresponding to the monitoring signal may be electrically isolated from the monitoring signal, and may be a signal of substantially the same level. Accordingly, when the monitoring signal is less than or equal to the third threshold level, the fourth switching element Q4 may be turned off, and when the monitoring signal exceeds the third threshold level, the fourth switching element Q4 may be turned on. The fourth switching element Q4 may connect the second terminal of the second resistor R2 to the ground in the turned-on state.

The controller U1 may form or close a path through which the output of the first conversion circuit 313 is transferred to the primary side of the transformer T1, based on an output or an input of the second conversion circuit 315.

According to an embodiment, the controller U1 may monitor power consumption (e.g., an amount of current consumption) of the load circuit connected to the secondary side of the transformer T1 through a feedback circuit (not illustrated). The controller U1 may adjust a turn-on period of the first switching element Q1 and the second switching element Q2, based on the power consumption of the load circuit. As a result, the controller U1 may control the first and second switching elements Q1 and Q2 such that the output current amount of the transformer T1 corresponds to the power consumption of the load circuit.

According to an embodiment, the controller U1 may cut off the output of the second conversion circuit 315 when the input current amount of the second conversion circuit 315 exceeds the overload criterion. For example, the controller U1 may receive a monitoring voltage corresponding to the input current amount of the transformer T1, and may control the first switching element Q1 and the second switching element Q2 such that the input power of the transformer T1 is cut off when the received monitoring voltage exceeds the second threshold level.

According to an embodiment, the controller U1 may use the first sensing circuit 317 to change the overload criterion from the first threshold current amount to the second threshold current amount when the second power module 320 is in the abnormal state. In the abnormal state of the second power module 320, since the monitoring voltage output from the first sensing circuit 317 is reduced by about ½ times compared to the normal state of the second power module 320, the controller U1 may allow the second conversion circuit 315 to output twice the rated current amount of the first power module 310.

According to the above-described embodiment, since the second conversion circuit 315 may change the overload criterion of the first power module 310 by using the first sensing circuit 317, the second conversion circuit 315 may support normal transfer of the output of the first power module 310 at least until the processor 330 identifies the abnormal state of the second power module 320 and lowers the luminance of the display 340, while lowering the rating of the first power module 310.

According to various embodiments, since the detailed configuration of the second power module 320 is the same as or similar to the configuration of the first power module 310 illustrated in FIGS. 4 and 5, detailed descriptions thereof will be omitted.

Figure 6:
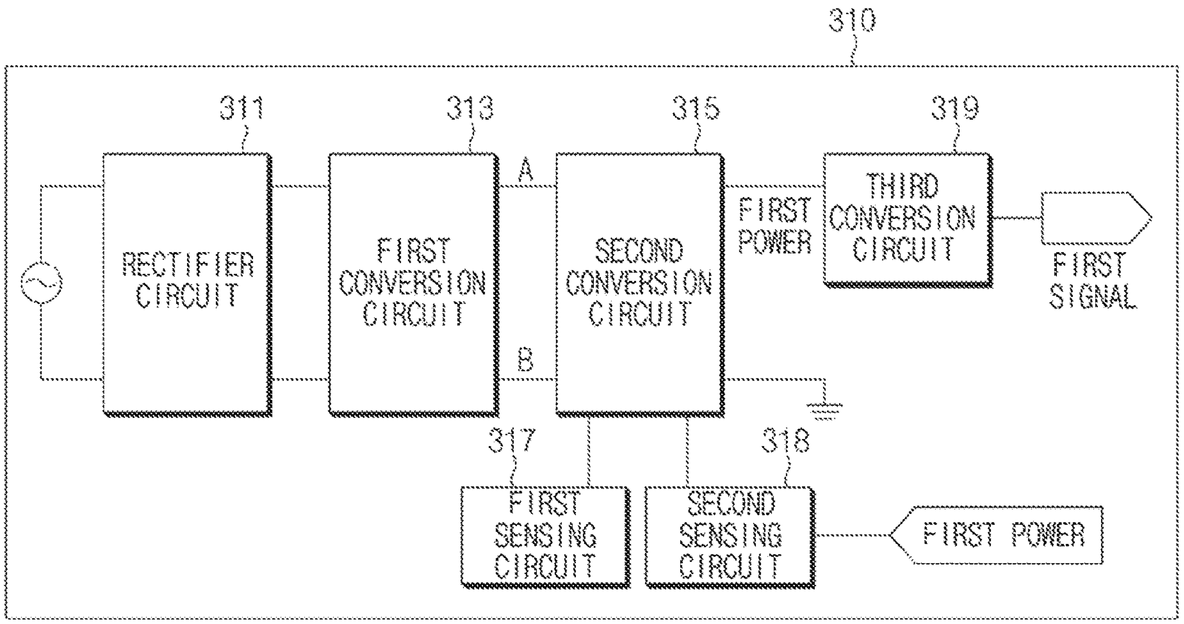
FIG. 6 illustrates a configuration diagram of a first power module including a second sensing circuit according to an embodiment.

FIG. 6 illustrates a configuration diagram of a first power module including a second sensing circuit according to an embodiment.

Referring to FIG. 6, the first power module 310 (e.g., the first power module 310 of FIG. 3) may include the rectifier circuit 311, the first conversion circuit 313, the second conversion circuit 315, the first sensing circuit 317, and a second sensing circuit 318. Since the first power module 310 of FIG. 6 is the same as or similar to the first power module 310 of FIG. 4, in FIG. 6, components different from the first power module 310 of FIG. 4 will be described.

According to an embodiment, the first sensing circuit 317 may output the monitoring voltage corresponding to an input current amount of the second conversion circuit 315.

According to an embodiment, the second sensing circuit 318 may sense the abnormal state of the second power module 320, based on the amount of output current of the second conversion circuit 315. The second sensing circuit 318 may output a detection signal after the second specified time elapses from a time when the abnormal state of the second power module 320 is sensed. The detection signal may be, for example, a signal of an active low level. The second specified time may be later than a time required to reduce the luminance of the display 340 to the threshold luminance or less, as the processor 330 senses the abnormal state of the first power module and transmits an instruction for luminance control to the display 340. The second specified time may be a time shorter (time point) than a maximum time at which the first power module 310 can output the second threshold current amount. For example, the second specified time may be a time set to prevent burnout of circuit elements of the first power module 310 after a time required to adjust the luminance of the display 340.

According to an embodiment, the second conversion circuit 315 may output a current corresponding to a current amount consumed by the load circuit (e.g., the display) connected to the output terminal of the second conversion circuit 315. For example, the second conversion circuit 315 may include the half bridge LLC resonant converter or the flyback converter including at least one transformer.

The second conversion circuit 315 may cut off the output of the second conversion circuit 315 when the input current amount of the second conversion circuit 315 exceeds the second threshold current amount. For example, the second conversion circuit 315 may receive the monitoring voltage from the first sensing circuit 317, and may cut off the output of the second conversion circuit 315 when the monitoring voltage exceeds a first threshold level. The second threshold current amount may be, for example, a maximum limit current amount of the first power module 310. The maximum limit current amount may be, for example, less than or equal to the maximum current amount at which the first power module 310 normally drives the display 340 for the first specified time. The first specified time may be less than or equal to a time required for the processor 330 to identify the abnormal state of the second power module 320 and to reduce the luminance of the display 340.

The second conversion circuit 315 may cut off the output of the first power module 310 after the second specified time from after the abnormal state of the second power module 320 is identified. For example, the second conversion circuit 315 may sense the abnormal state of the second power module, based on the detection signal. By the way, since the second sensing circuit 318 outputs the detection signal after the second specified time from the time when the abnormal state of the second power module 320 is sensed, the second conversion circuit 315 may cut off the output of the first power module when the output current amount of the first power module 310 exceeds the fifth threshold current amount after the specified time from after the abnormal state of the second power module 320 is sensed. The fifth threshold current amount may be, for example, an output current amount (e.g., a maximum power consumption) of the first power module 310 corresponding to a state in which the luminance of the display 340 is the threshold luminance.

According to the above-described embodiment, the first power module 310 may identify the abnormal state of the second power module 320, based on a change in the first output current amount. When the luminance of the display 340 is not reduced below the threshold luminance by the processor 330 in the abnormal state of the second power module 320, the first power module 310 may prevent a failure of the first power module 310 due to an overload of the first power module 310 by cutting off the output of the first power module 310.

Figure 7:
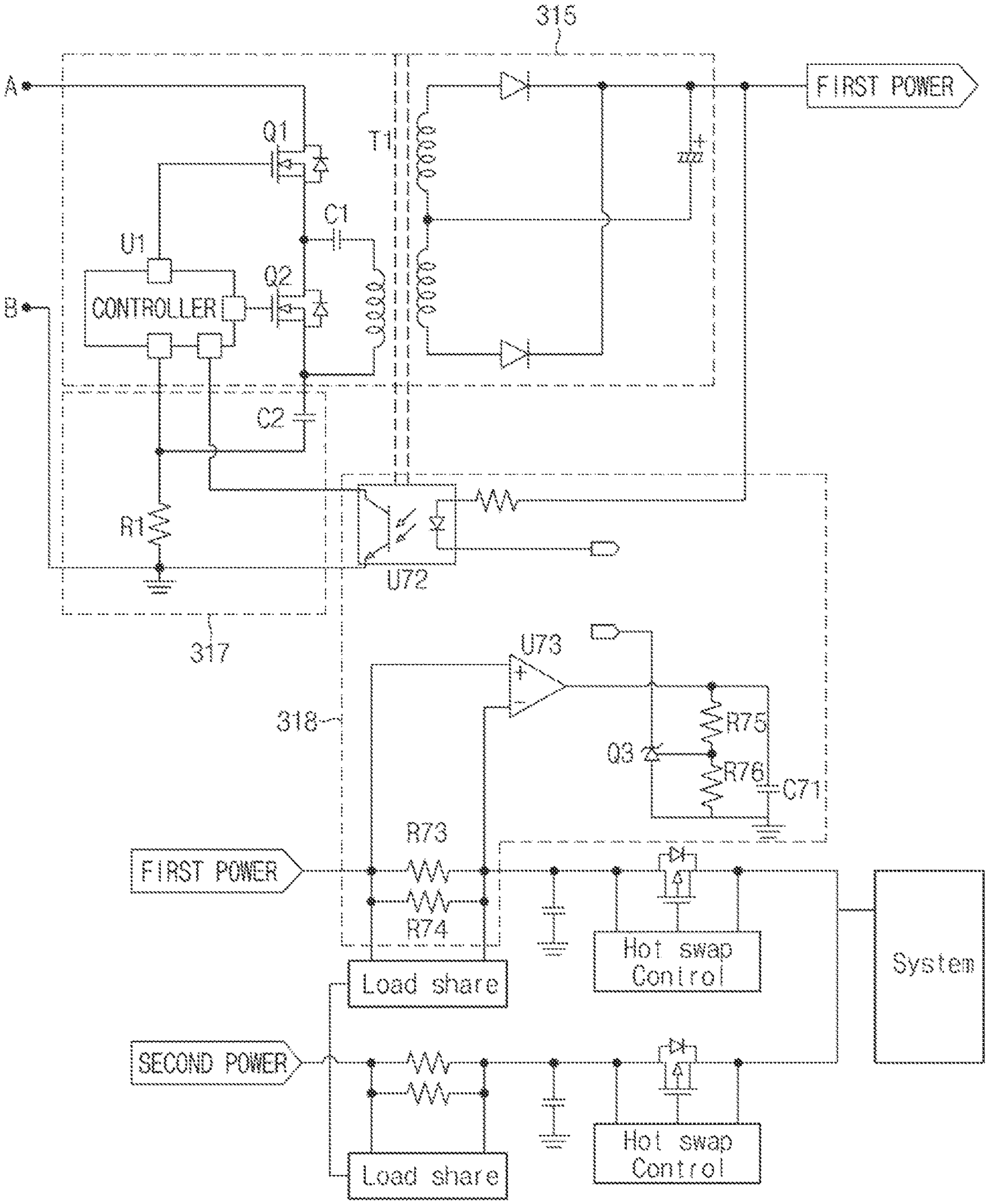
FIG. 7 illustrates a detailed circuit diagram of a first sensing circuit, a second sensing circuit, and a second conversion circuit according to an embodiment.

FIG. 7 illustrates a detailed circuit diagram of a first sensing circuit and a second sensing circuit according to an embodiment.

Referring to FIG. 7, the second conversion circuit 315 may include the first switching element Q1, the second switching element Q2, the transformer T1, the first capacitor C1, and the controller U1. Since the second conversion circuit 315 is the same as or similar to the second conversion circuit 315 of FIG. 4, a configuration of the controller U1 that is different from the second conversion circuit 315 of FIG. 4 will be mainly described.

The controller U1 may include a first input terminal and a second input terminal, and may cut off the output of the second conversion circuit 315, based on a signal received to the first input terminal or the second input terminal. For example, when the signal received to the first input terminal exceeds the second threshold level corresponding to the second threshold current amount, the controller U1 may cut off the output of the second conversion circuit 315 by using the first switching element Q1 and the second switching element Q2. For another example, the controller U1 may cut off the output of the second conversion circuit 315 when the signal (detection signal) received to the second input terminal is less than or equal to a fourth threshold level. The fourth threshold level may be, for example, a criterion by which the controller U1 determines whether a signal received to the second input terminal is in the low state.

The first sensing circuit 317 may include the first resistor R1 and the second capacitor C2. The first resistor R1 may receive at least a part of the output current of the primary winding of the transformer T1 through the second capacitor C2, and may output the monitoring voltage (a voltage across the first resistor R1) corresponding to the received current. The second capacitor C2 may couple (or block) direct current from at least a part of the output current of the primary winding of the transformer T1.

The second sensing circuit 318 may include the load resistors R73 and R74, the comparator U73, the third switching element Q3, a dividing circuit R75 and R76, the delay element C71, and a photo coupler U72.

The load resistors R73 and R74 may be connected in series on the output path of the first power module 310. The load resistors R73 and R74 may include, for example, the second resistor R73 and the third resistor R74 connected in parallel with each other. A voltage across the load resistors R73 and R74 may be input to the first input terminal (+ input) and the second input terminal (− input terminal) of the comparator U73.

The comparator U73 may receive the voltage across the load resistors R73 and R74, and may output a specified signal when the voltage across the load resistors R73 and R74 exceeds a fifth threshold level. For example, the comparator U73 may be provided to output a signal having a low level when the voltage across the load resistors R73 and R74 is less than or equal to the fifth threshold level, and to output a signal having the high level when the voltage across the load resistors R73 and R74 exceeds the fifth threshold level.

The fifth threshold level may be set to correspond to a case where the output current amount of the second conversion circuit 315 exceeds the fifth threshold current amount, based on, for example, resistance values of the load resistors R73 and R74.

The delay element C71 may delay the output of the comparator U73 by the second specified time. The delay element C71 may be, for example, a capacitor having a capacitance capable of delaying the output of the comparator U73 by the second specified time. The second specified time may be later than a time required to reduce the luminance of the display 340 to the threshold luminance or less, as the processor 330 senses the abnormal state of the first power module and transmits the instruction for luminance control to the display 340. The second specified time may be a time (time point) shorter than the maximum time at which the first power module 310 can output the second threshold current amount. For example, the second specified time may be a time set to prevent burnout of the circuit elements of the first power module 310 after a time required to adjust the luminance of the display 340. The second specified time may be, for example, 150 ms.

The dividing circuit R75 and R76 may be connected to the output terminal of the comparator U73, and may divide the output signal of the comparator U73 at a specified ratio for switching of the third switching element Q3. The dividing circuit R75 and R76 may include the fourth resistor R75 and the fifth resistor R76, a first terminal of the fourth resistor R75 may be connected to the output terminal of the comparator U73, and a second terminal of the fourth resistor R75 may be connected to a first terminal of the fifth resistor R76. A second terminal of the fifth resistor R76 may be connected to the ground. The second terminal of the fourth resistor R75 and the first terminal of the fifth resistor R76 may be connected to a third terminal of the third switching element Q3.

Depending on a signal that is applied to the third terminal of the third switching element Q3, the first terminal of the third switching element Q3 and the second terminal of the third switching element Q3 may be shorted or opened. For example, when a voltage of less than or equal to the third threshold level (e.g., 2.5V) is applied to the third terminal of the third switching element Q3, the first terminal of the third switching element Q3 and the second terminal of the third switching element Q3 may be opened. When a voltage that exceeds the third threshold level (e.g., 2.5V) is applied to the third terminal of the third switching element Q3, the first terminal of the third switching element Q3 and the second terminal of the third switching element Q3 may be shorted. In the above-described embodiment, the dividing circuit R75 and R76 and the third switching element Q3 function as an inverting circuit for inverting the output of the comparator U73, and may be configured in different forms.

The photo coupler U72 may transfer a signal of the first terminal (output terminal) of the third switching element Q3 to the second input terminal of the controller U1. The photo coupler U72 may be provided to isolate the primary side signal and the secondary side signal of the second conversion circuit 315.

In short, when the output current amount of the second conversion circuit 315 exceeds the fifth threshold current amount, the comparator U73 may output a specified signal. The specified signal may be delayed for the second specified time by the delay element C71 and may be applied to the second input terminal of the controller U1. As the processor 330 adjusts the luminance of the display 340 to be less than or equal to the threshold luminance, when the output current of the second conversion circuit 315 is changed to be less than or equal to the fifth threshold current amount, the comparator U73 may no longer output the specified signal. In this case, the controller U1 may adjust the output of the second conversion circuit 315, based on the current amount consumed by the display 340.

In contrast, when the output current amount exceeds the fifth threshold current amount even after the lapse of the second specified time, as a signal corresponding to the specified signal is transferred to the second input terminal of the controller U1, the controller U1 may cut off the output of the second conversion circuit 315, According to the above-described embodiment, as the luminance of the display 340 is not reduced by the processor 330 in the abnormal state of the second power module 320, the first power module 310 may cut off the output of the first power module 310 to avoid overloading the first power module 310, using the second conversion circuit 315 and the second sensing circuit 318.

According to various embodiments, the comparator U73 may be configured with an amplifier. In this embodiment, the amplifier may receive the voltage (the voltage corresponding to the output current amount of the first power module 310) across the load resistors R73 and R74, may amplify the input voltage by a specified amplification ratio, and may output the amplified voltage. The output voltage of the amplifier may be delayed by the delay element C71 by the second specified time. The output voltage of the amplifier may be delayed by the delay element C71 and then may be divided at a specified ratio by the dividing circuit R75 and R76. The voltage divided by the dividing circuit R75 and R76 may be applied to the third terminal of the third switching element Q3. The first terminal and the second terminal of the third switching element Q3 may be shorted when the voltage applied to the third terminal of the third switching element Q3 exceeds the third threshold level. The amplification ratio of the amplifier and the dividing ratio (the specified ratio) of the dividing circuit R75 and R76 may be determined such that a result voltage obtained by dividing the output voltage of the amplifier when the voltage across the load resistors R73 and R74 is greater than or equal to the fifth threshold level may exceed the third threshold level.

According to various embodiments, since the detailed configuration of the second power module 320 is the same as or similar to the configuration of the first power module 310 illustrated in FIGS. 6 and 7, a detailed description thereof will be omitted.

Figure 8:
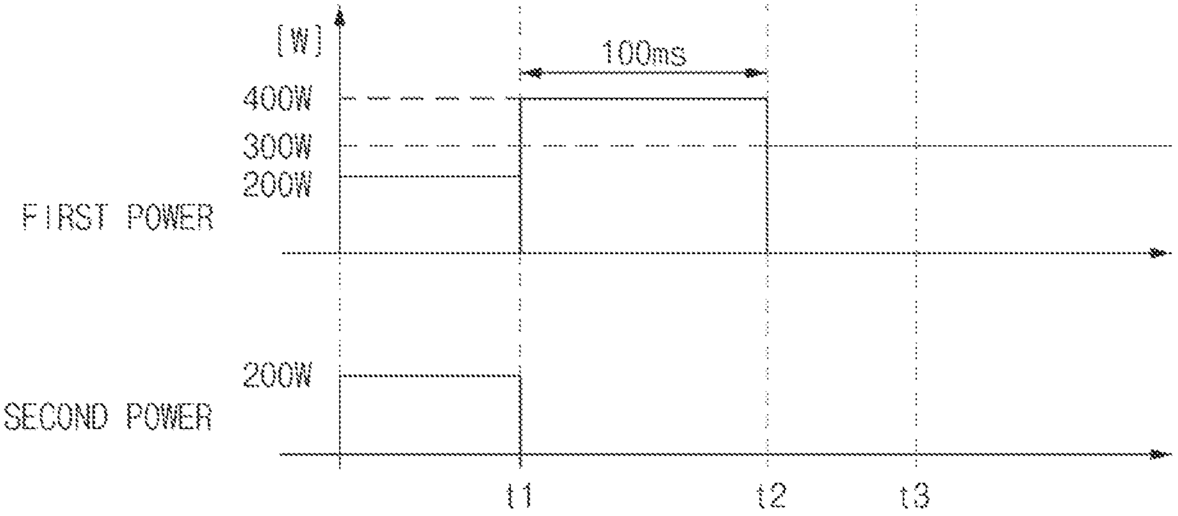
FIG. 8 illustrates output power of a first power module when a luminance of a display is normally reduced in an abnormal state of a second power module, according to an embodiment.

FIG. 8 illustrates output power of a first power module when a luminance of a display is normally reduced in an abnormal state of a second power module, according to an embodiment.

Referring to FIGS. 7 and 8, before a time t1, the first power module 310 and the second power module 320 may be in the normal state. In this case, the first power module 310 and the second power module 320 may output the first power (e.g., 200 W) and the second power (e.g., 200 W), respectively.

At time t1, the second power module 320 may enter the abnormal state due to a failure or the like. At time t1, the processor 330 may sense the abnormal state of the second power module 320, and the luminance of the display 340 may be reduced at a time t2, based on the control of the processor 330.

The controller U1 of the first power module 310 may determine whether the output current amount of the first power module 310 exceeds the fifth threshold current amount (300 W current consumption amount, a current amount that the first power module 310 handles the display 340 by itself while the luminance is adjusted) at the time t1, and may determine whether the output current amount of the first power module 310 exceeds the fifth threshold current amount at a time t3, which is the second specified time from the time t1.

When the controller U1 of the first power module 310 identifies that the output current amount of the first power module 310 does not exceed the fifth threshold current amount at the time t3, In response to the control of the processor 330, the fifth threshold current amount (300 W current consumption amount, a current consumption amount that the first power module 310 may handle depending on the luminance adjustment of the display) may be supplied to the display 340 after the time t2.

Figure 9:
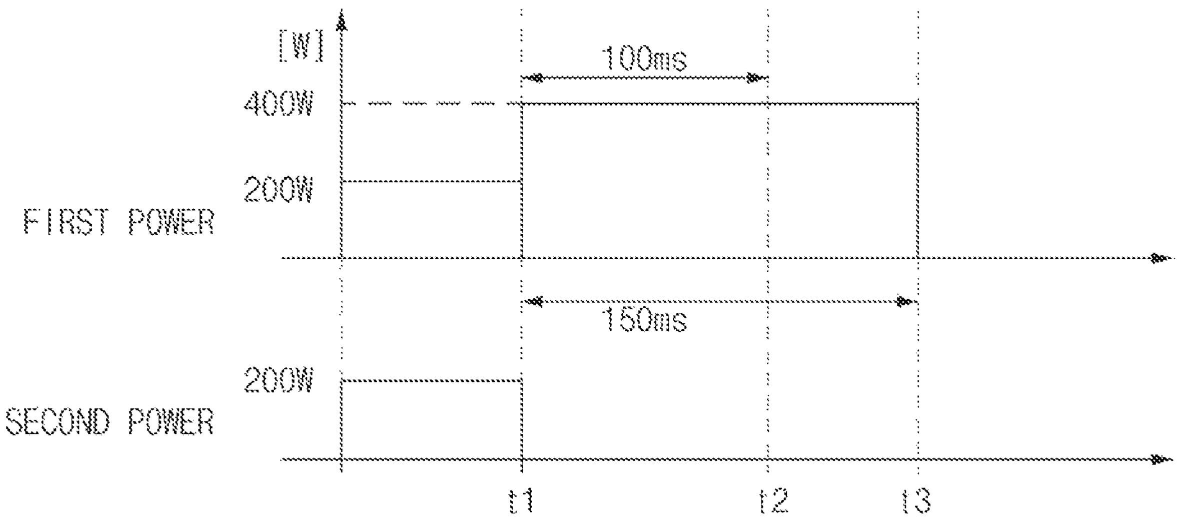
FIG. 9 illustrates output power of a first power module when a luminance of a display is not reduced in an abnormal state of a second power module, according to an embodiment.

FIG. 9 illustrates output power of a first power module when a luminance of a display is not reduced in an abnormal state of a second power module, according to an embodiment.

Referring to FIGS. 7 and 9, before the time t1, the first power module 310 and the second power module 320 may be in the normal state. In this case, the first power module 310 and the second power module 320 may output the first power and the second power, respectively.

At the time t1, the second power module 320 may be in the abnormal state due to a failure or the like. When, at a time t1, the processor 330 does not sense the abnormal state of the second power module 320 or an abnormality of another circuit (e.g., the display) of the display device 300 occurs, the first power module 310 may output a current (a current amount corresponding to 400 W) exceeding the fifth threshold current amount up to a time t3. In this case, the first power module 310 may cut off the output of the first power module 310. For example, the controller U1 of the first power module 310 may cut off the output of the second conversion circuit 315 by using the first switching element Q1.

According to the above-described embodiment, as the first power module 310 cuts off the output of the first power module 310 when the abnormality occurs in the display device 300 including the second power module 320, a burnout of the first power module 310 due to the overload on the first power module 310 may be prevented.

Figure 10:
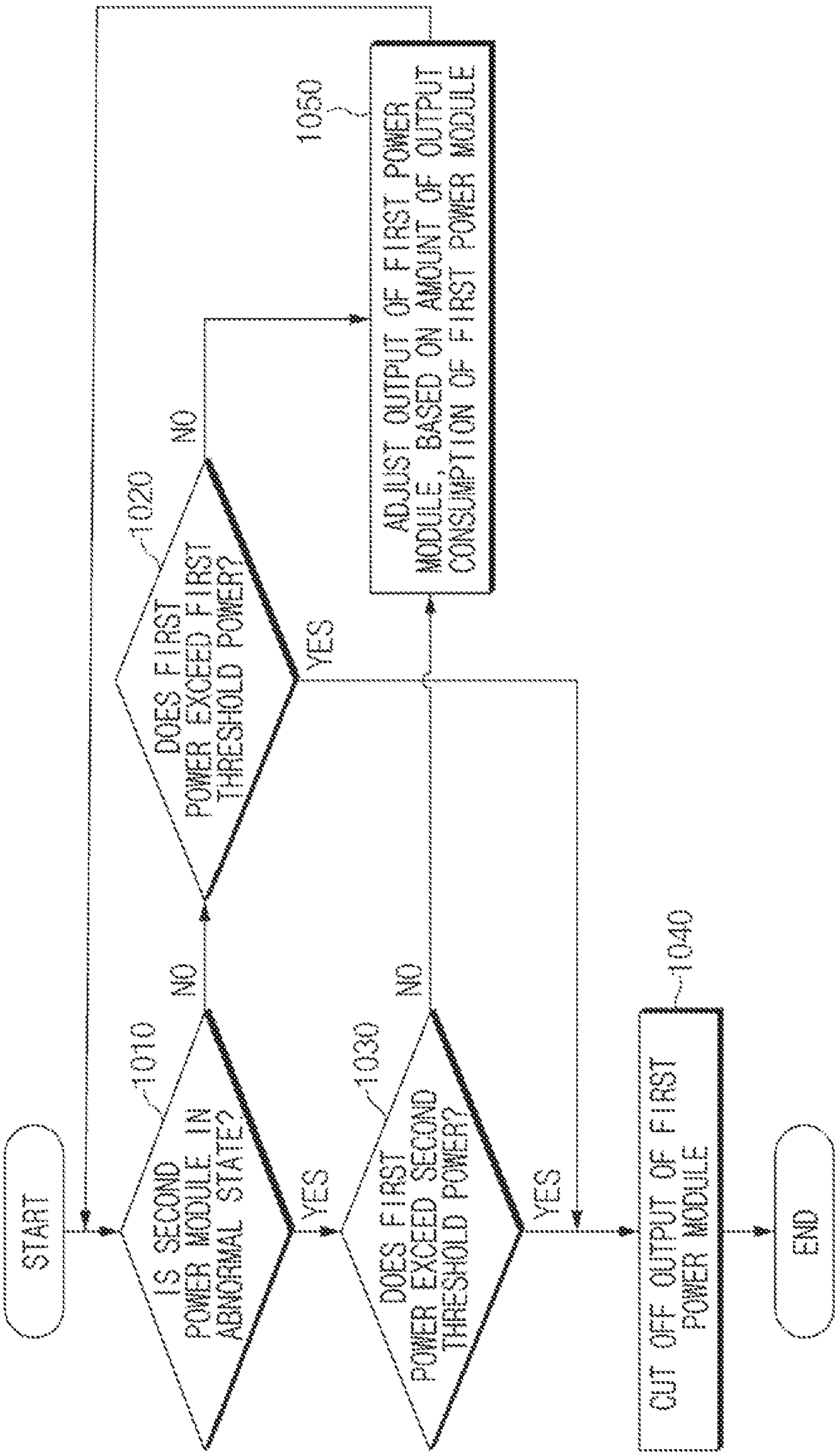
FIG. 10 is a flowchart of a power control method of a first power module including a first sensing circuit according to an embodiment.

FIG. 10 is a flowchart of a power control method of a first power module including a first sensing circuit according to an embodiment.

Referring to FIGS. 4, 5 and 10, in operation 1010, the first power module 310 may determine whether the second power module 320 is in the abnormal state, based on the input current amount (the amount of input current input to the primary side of the transformer of the first power module 310).

When the second power module 320 is in the normal state in operation 1010, the controller U1 of the first power module 310 in operation 1020 may monitor whether the input current amount of the first power module 310 is less than or equal to the first threshold current amount. The first threshold current amount (e.g., 200 W) may be, for example, a current amount corresponding to the rating of the first power module 310.

When the controller U1 of the first power module 310 identifies the abnormal state of the second power module 320 in operation 1010 (e.g., receiving a signal corresponding to the abnormal state from the second power module 320), in operation 1030, whether the input current amount of the first power module 310 (e.g., the current amount supplied to the display) exceeds the second threshold current amount (e.g., 400 W) may be monitored. For example, as the second power module 320 fails to supply power to the display 340 normally, the first power module 310 may control the output current amount corresponding to the power consumption amount of the display 340, and correspondingly, whether the input current amount of the first power module 310 exceeds the second threshold current amount may be monitored. The second threshold current amount (>first threshold current amount) may be, for example, the maximum limit current amount of the first power module 310. The maximum limit current amount may be, for example, less than or equal to the maximum current amount at which the first power module 310 normally drives for the first specified time (a time required for luminance adjustment). The first specified time may correspond to, for example, a time required for the processor 330 to identify the abnormal state of the second power module 320 and to reduce the luminance of the display 340.

In operation 1020, when the input current amount of the first power module 310 exceeds the first threshold current amount in the normal state of the second power module 320, in operation 1040, the first power module 310 may cut off the output of the first power module 310.

In operation 1030, when the input current amount of the first power module 310 exceeds the second threshold current amount, in operation 1040, the output of the first power module 310 may be cut off.

In operation 1020, when the input current amount of the first power module 310 is less than or equal to the first threshold current amount in the normal state of the second power module 320 (a first case), the first power module 310 may adjust the output of the first power module 310, based on the amount of output consumption of the first power module 310.

In operation 1030, when the input current amount is less than or equal to the second threshold current amount in the abnormal state of the second power module 320 (in a second case), the first power module 310 may adjust the output of the first power module 310, based on the amount of output consumption of the first power module 310. The amount of output consumption may be, for example, a power consumption amount of a load circuit (e.g., a processor, a display, or the like) that consumes the output of the first power module 310 and the second power module 320.

Figure 11:
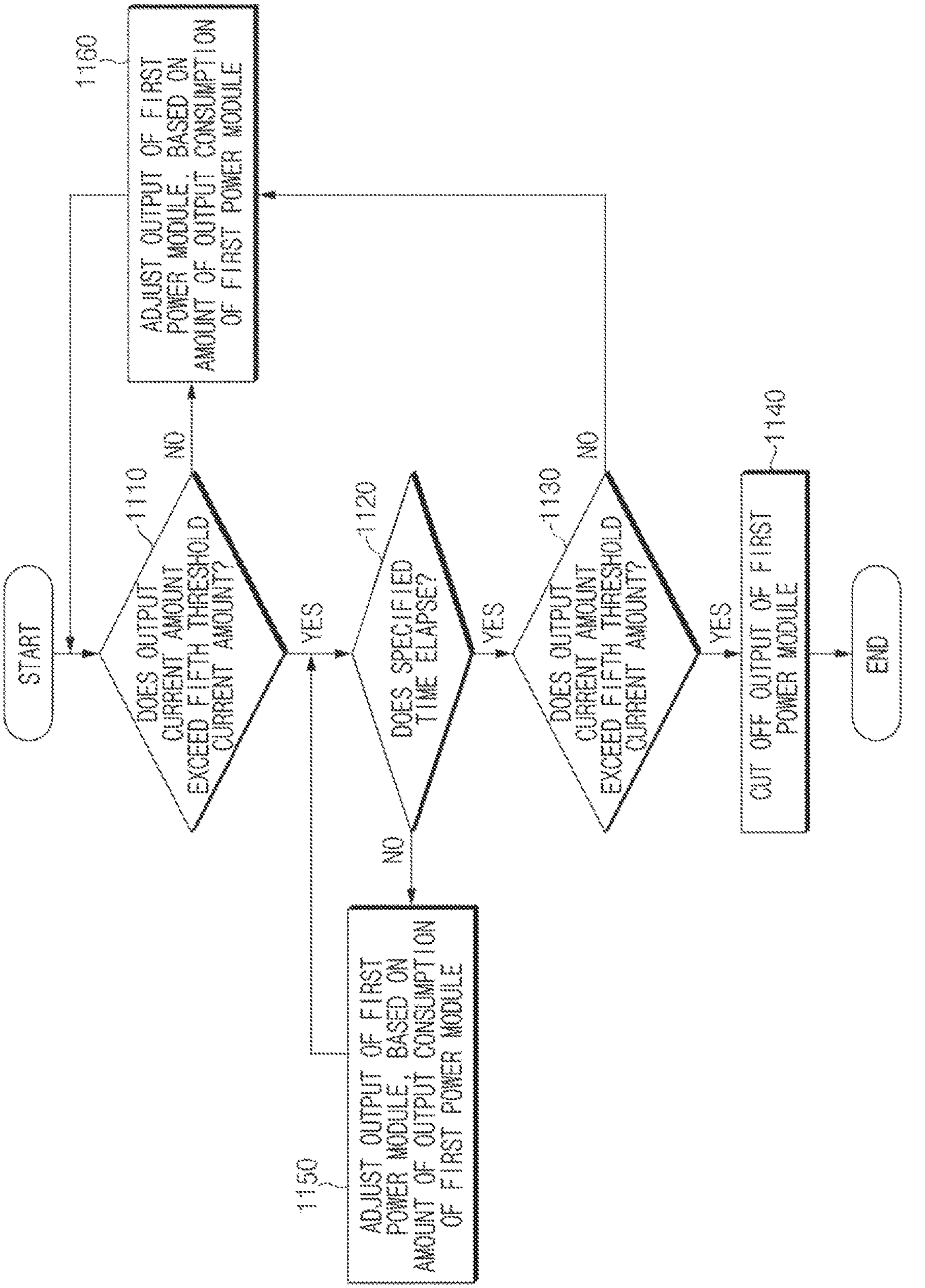
FIG. 11 is a flowchart of a power control method of a first power module including a second sensing circuit according to an embodiment.

FIG. 11 is a flowchart of a power control method of a first power module including a second sensing circuit according to an embodiment.

Referring to FIGS. 7 and 11, in operation 1110, the first power module 310 may monitor whether the output current amount exceeds the fifth threshold current amount. The fifth threshold current amount may be, for example, an output current amount (e.g., the maximum power consumption) of the first power module 310 corresponding to a state in which the luminance of the display 340 is the threshold luminance.

When it is determined that the output current amount exceeds the fifth threshold current amount, in operation 1120, the first power module 310 may determine whether the time when the output current amount exceeds the fifth threshold current amount passes the second specified time.

When the specified time elapses from the time when the output current amount exceeds the fifth threshold current amount (when the second specified time is elapsed), in operation 1130, the first power module 310 may determine whether the output current amount exceeds a time when the fifth threshold current amount is exceeded.

When it is determined in operation 1130 that the output current amount exceeds the fifth threshold current amount even after the lapse of the second specified time, in operation 1140, the first power module 310 may cut off the output of the first power module 310.

When the time (interval) in which the output current amount exceeds the fifth threshold current amount does not pass the second specified time (interval), the first power module 310 may determine whether the second specified time is elapsed, while adjusting the output power of the first power module 310 (supplying the current amount depending on the fifth threshold power), based on the output consumption amount of the first power module 310.

When the output current amount is less than or equal to the fifth threshold current amount, in operation 1160, the first power module 310 may adjust the output power of the first power module 310, based on the output consumption amount of the first power module 310. For example, the output of the first power module 310 may be adjusted to correspond to the current consumption amount of the display 340.

Figure 12:
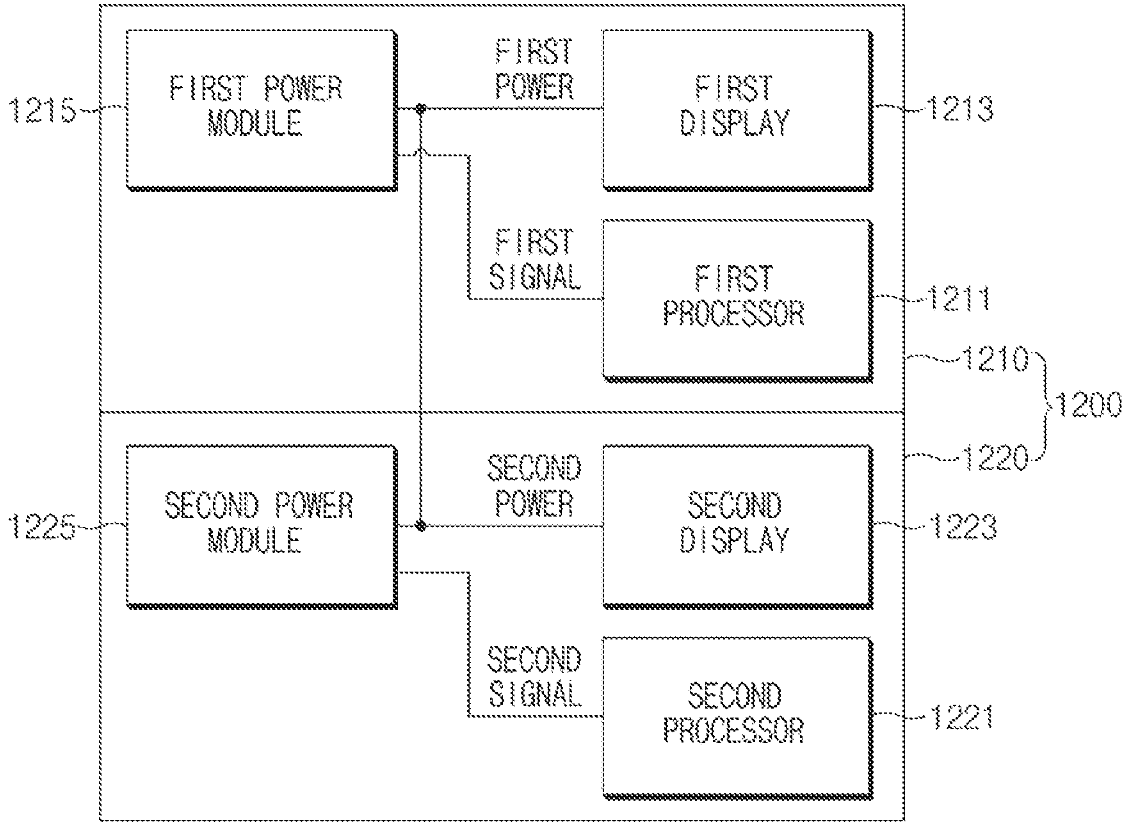
FIG. 12 is another example of a display system according to an embodiment.

FIG. 12 is another example of a display system according to an embodiment.

Referring to FIG. 12, a display system 1200 may include a first display device 1210 and a second display device 1220. The embodiment of FIG. 12 is different from the above-described embodiments in that power of first and second power modules 1215 and 1225 included in the first and second display devices 1210 and 1220, respectively are connected in parallel, and the description will be focused on the differences.

The first display device 1210 may include a first processor 1211 (e.g., the processor 330 in FIG. 3), a first display 1213 (e.g., the display 340 in FIG. 3), and the first power module 1215 (e.g., the first power module 310 of FIG. 3).

The first processor 1211 and the first display 1213 may be driven using the output power of the first power module 1215. Since the outputs of the first power module 1215 and the second power module 1225 are connected in parallel (load share), when a failure of the first power module 1215 occurs, the first processor 1211 and the first display 1213 may be driven using power from the second power module 1225. The first processor 1211 may identify the abnormal state of the first power module 1215, based on the first signal generated from the first power, and may reduce the luminance of the first display 1213 when the abnormality occurs in the first power module 1215. For example, when the first signal generated from the first power is less than or equal to the first threshold value, the first processor 1211 may determine that the first power module 1215 is in the abnormal state, and may reduce the luminance of the first display 1213.

The second display device 1220 may include a second processor 1221 (e.g., the processor 330 of FIG. 3), a second display 1223 (e.g., the display 340 of FIG. 3), and the second power module 1225 (e.g., the second power module 320 of FIG. 3).

The second processor 1221 and the second display 1223 may be driven using the output power of the second power module 1225. Since the outputs of the first power module 1215 and the second power module 1225 are parallel, when a failure of the second power module 1225 occurs, the second processor 1221 and the second display 1223 may be driven using power from the first power module 1215. The second processor 1221 may identify an occurrence of the abnormality in the second power module 1225, based on the second signal generated from the second power, and may reduce the luminance of the second display 1223 when the abnormality occurs in the second power module 1225. For example, when the second signal generated from the second power is less than or equal to the first threshold value, the second processor 1221 may determine that the second power module 1225 is in the abnormal state, and may reduce the luminance of the second display 1223.

The first power module 1215 of the first display device 1210 and the second power module 1225 of the second display device 1220 may share a load. For example, since the outputs of the first power module P1215 and the second power module P1225 are connected in parallel to each other, power be supplied to the first and second displays 1213 and 1223 included in the first and second display devices 1210 and 1220 different from each other. When a failure occurs in the first power module 1215, the second power module 1225 may support consumers to not be greatly aware of the occurrence of the failure in the first power module 1215 by supplying power to the first display 1213 and the first processor 1211. Likewise, when a failure occurs in the second power module 1225, the first power module 1215 may support consumers to not be greatly aware of the occurrence of the failure in the second power module 1225 by supplying power to the second display 1223 and the second processor 1221.

According to an embodiment, the first power module 1215 is provided to cut off the output of the first power module 1215 when an overload occurs in the first power module 1215. However, when the overload of the first power module 1215 occurs due to the failure of the second power module 1225, the first power module 1215 may support the first power module 1215 to replace the function of the second power module 1225 by changing the overload criterion. For example, when the first sensing circuit (e.g., the first sensing circuit 317 of FIG. 4) of the first power module 1215 identifies that the second power is not received from the second power module 1225, the overload criterion may be changed. As another example, the first sensing circuit (e.g., the first sensing circuit 317 of FIG. 4) of the first power module 1215 *t* may change (e.g., increase) the overload criterion when the output power of the first power module 1215 increases due to a failure occurrence of the second power module 1225. The configuration in which the first power module 1215 changes the overload criterion has been described above with reference to FIGS. 4 and 5, and thus detailed description thereof will be omitted.

According to various embodiments, when the first power module 1215 identifies that the luminance of the second display 1223 is not reduced when the abnormality occurs in the second power module 1225, based on the output current amount of the first power module 1215, the first power module 1215 may cut off the output of the first power module 1215. For example, even after the second specified time elapses from the time when the output current amount of the first power module 1215 exceeds the fifth threshold current amount—as the luminance of the second display 1223 is not reduced—when the output current of the first power module 1215 exceeds the fifth threshold current amount, the controller (e.g., U1 in FIG. 7) of the first power module 1215 may cut off the output of the first power module 1215. The configuration in which the first power module 1215 cuts off the output of the first power module 1215, based on the output current amount of the first power module has been described above with reference to FIGS. 6 and 7, and thus a detailed description thereof will be omitted.

Figure 13:
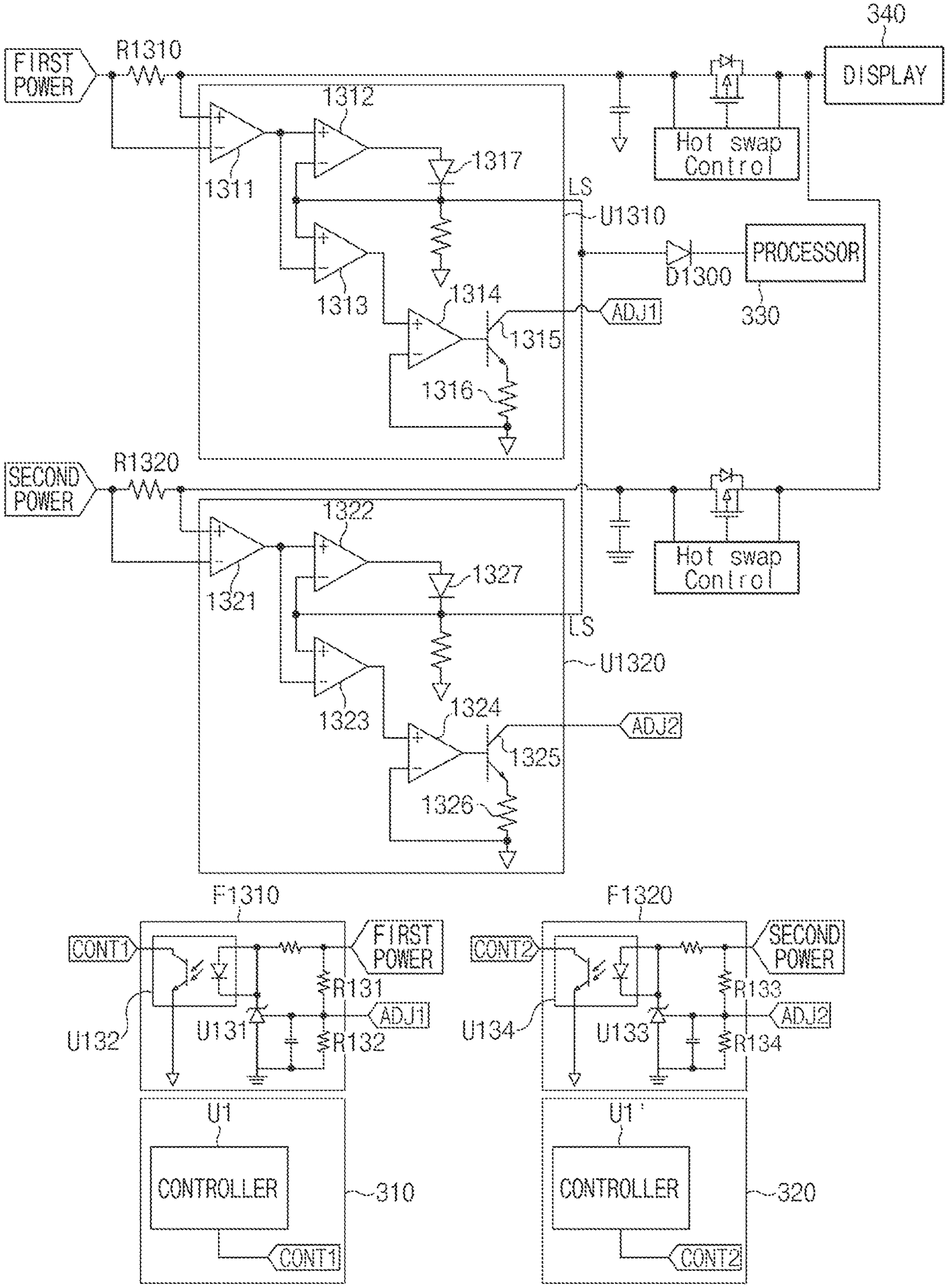
FIG. 13 illustrates another example of sensing an abnormal state of a first power module or a second power module by a processor according to an embodiment.

FIG. 13 illustrates another example of sensing an abnormal state of a first power module or a second power module by a processor according to an embodiment.

Referring to FIG. 13, an output (the first power) of the first power module (e.g., 310 in FIG. 6) and an output (the second power) of the second power module (e.g., 320 in FIG. 3) may be connected in parallel through a first load resistor R1310 (e.g., the load resistors R73 and R74 in FIG. 7) and a second load resistor R1320, respectively.

A first integrated circuit U1310 and a second integrated circuit U1320 may be provided to equally match the output current amount of the first power module 310 and the output current amount of the second power module 320, which are connected in parallel with each other. Each of the first integrated circuit U1310 and the second integrated circuit U1320 may be, for example, a load share integrated circuit (IC). The first integrated circuit U1310 may compare the output current amount of the first power module 310 (the voltage across the first load resistor R1310 or the output current amount of the first power) with the output current amount of the second power module 320 (the LS signal of the second integrated circuit U1320), and may increase the output current amount of the first power module 310 when the current amount of the first power module 310 is less than the output current amount of the second power module 320. The first integrated circuit U1310 may decrease the magnitude of the LS signal when the output current of the first power module 310 is greater than the output current of the second power. In this case, the second integrated circuit U1320 may increase the output current amount of the second power module 320, based on the magnitude of the LS signal.

According to an embodiment, the first integrated circuit U1310 may include an amplifier 1311, a first comparator 1312, a second comparator 1313, a third comparator 1314, a switching element 1315, and an internal resistor 1316, and the second integrated circuit U1320 may include an amplifier 1321, a first comparator 1322, a second comparator 1323, a third comparator 1324, a switching element 1325, and an internal resistor 1326. When the output current amount (current corresponding to the first power) of the first power module 310 is greater than the output current amount (a current corresponding to the second power) of the second power module 320, as the output voltage of the amplifier 1311 of the first integrated circuit U1310 increases, the first comparator 1312 of the first integrated circuit U1310 may output a high signal. In this case, the second comparator 1313 and the third comparator 1314 output a low signal. On the other hand, as the output of the amplifier 1321 of the second integrated circuit U1320 decreases, the output of the amplifier 1321 may be less than a signal (the LS signal) which is output from the first comparator 1312 of the first integrated circuit U1310 and passed through a diode 1317. Then, the first comparator 1322 of the second integrated circuit U1320 may output the low signal, and the second comparator 1323 and the third comparator 1324 of the second integrated circuit U1320 may output the high signal. Accordingly, the switching element 1325 of the second integrated circuit U1320 is turned on, and may increase the output of the second power module 320 through a second feedback circuit F1320. For example, the second feedback circuit F1320 may include a constant voltage circuit U133, a first resistor R133, a second resistor R134, and a photo coupler U134. First and second terminals of the constant voltage circuit U133 (e.g., TL431) may be shorted when a voltage greater than a reference voltage (e.g. 2.5V) is applied to a third terminal of the constant voltage circuit U133, otherwise the first and second terminals of the constant voltage circuit U133 may be opened. The first resistor R133 and the second resistor R134 may divide the voltage of the second power, the divided voltage may be applied to a third terminal of the constant voltage circuit U133. When the switching element 1325 of the second integrated circuit U1320 is turned off, the voltage divided by the first resistor R133 and the second resistor R134 is equal to or greater than the reference voltage, but when the switching element 1325 is turned on, the voltage applied to the third terminal of the constant voltage circuit U133 falls below the reference voltage due to the internal resistor 1326 of the second integrated circuit U1320, then the first and second terminals of the constant voltage circuit U133 may be opened. In this case, the voltage of the feedback terminal of a controller U1' (e.g., U1 in FIG. 7) of the second power module 320 is boosted, and the controller U1' (e.g., U1 in FIG. 7) of the second power module 320 may increase the output power (the second power) of the second power module 320 by controlling (duty ratio increase control or switching frequency decrease control) at least one switching element (e.g., Q1 and Q2 of FIG. 7). According to various embodiments, when the output current of the second power module 320 is greater than the output current of the first power module 310, the first integrated circuit U1310, the first feedback circuit F1310, and the controller U1 (e.g., U1 in FIG. 7) of the first power module 310 may increase the output power of the first power module 310 through the above-described control.

The LS signal of the first integrated circuit U1310 and the LS signal of the second integrated circuit U1320 may be connected in parallel to each other and then may be transferred to the processor 330 through a diode D1300. The processor 330 may receive at least one of the LS signal of the first integrated circuit U1310 and the LS signal of the second integrated circuit U1320 through the diode D1300, and may determine whether the first power or the second power is abnormal, based on the magnitude of the received signal. The processor 330 may reduce the luminance of the display 340 to less than the threshold luminance when it is identified that the magnitude of the received signal is greater than or equal to the specified magnitude. According to the above-described embodiment, as the LS signal of the first integrated circuit U1310 increases in proportion to the current amount of the first power, and the LS signal of the second integrated circuit U1320 increases in proportion to the current amount of the second power, the signal received by the processor 330 through the diode D1300 may increase in proportion to the current amount of the first power or the current amount of the second power. Therefore, the processor 330 may monitor whether the first power module 310 or the second power 320 is abnormal, based on the output signal (e.g., the LS signal) of the load share IC (the first integrated circuit U1310 or the second integrated circuit U1320).

Figure 14:
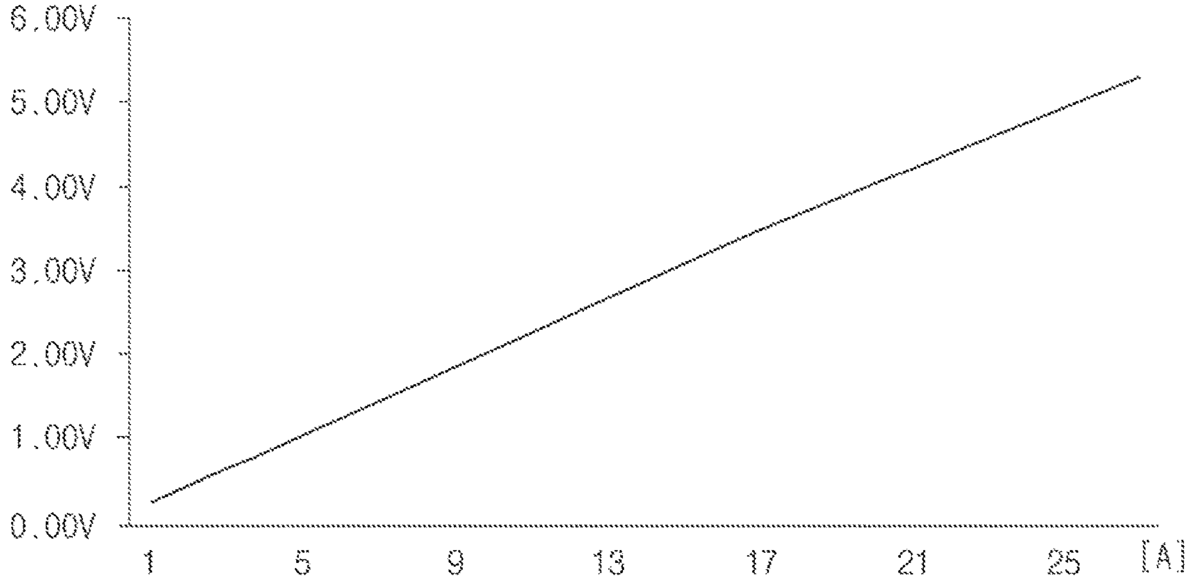
FIG. 14 is a graph illustrating a LS signal of a first integrated circuit according to an embodiment.

FIG. 14 is a graph illustrating a LS signal of a first integrated circuit according to an embodiment. In FIG. 14, a horizontal axis represents the current amount of the first power, and a vertical axis represents the magnitude of the LS signal.

Referring to FIG. 14, the LS signal of the first integrated circuit U1310 may increase in proportion to the current amount of the first power. For example, in the normal state of the first power module 310, the LS signal of the first integrated circuit U1310 may be about 2V. However, in the abnormal state (e.g., a state in which the current amount of the first power increases due to a failure of the second power module 320) of the second power module 320, the LS signal of the first integrated circuit U1310 is about twice as large. (e.g., about 4V). Accordingly, the processor 330 may detect the abnormal state of the first power module 310 or the second power module 320 by monitoring the magnitude of the LS signal.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. Accordingly, the scope of the disclosure should be construed as including all changes or various other embodiments based on the technical spirit of the disclosure.

The invention claimed is:

1. A display device comprising:
- a display including a plurality of sub display which are driven by a driving power;
- a first power module, provided in each of the plurality of sub display, configured to output a first power as a portion of the driving power; and
- a second power module, provided in the each of the plurality of sub display, configured to output a second power as a remaining portion of the driving power,
- wherein an initial threshold current amount of the first power being output as the portion of the driving power is adjusted to a subsequent threshold current amount that is different from the initial threshold current amount of the first power based an abnormal state of the second power module, and
- an initial threshold current amount of the second power being output as the remaining portion of the driving power is adjusted to a subsequent threshold current amount that is different from the initial threshold current amount of the second power based an abnormal state of the first power module.

2. The display device of claim 1, wherein the first power module is configured to:
- identify whether the second power module is abnormal based on the second power; and
- output a third power corresponding to the driving power, in an abnormal state of the second power module.

3. The display device of claim 2, wherein the first power module is configured to:
- provide the third power after cutting off the output of second power.

4. The display device of claim 2, wherein the first power module is configured to:
- output the first power based on a first overload criterion that corresponds a first threshold current amount, in a normal state of the second power module; and
- output the third power based on a second overload criterion that corresponds a second threshold current amount greater than the first threshold current amount, in the abnormal state of the second power module.

5. The display device of claim 4, wherein the first power module is configured to:
- cut off the output of the first power based on an amount of input current of the first power module exceeding the first threshold current amount, in the normal state of the second power module; and
- cut off the output of the first power based on the amount of input current of the first power module exceeding the second threshold current amount, in the abnormal state of the second power module.

6. The display device of claim 2, further comprising:
- a processor, and
- wherein the processor is configured to:
  - set a luminance of the sub display which the first power and the second power are supplied, to a first luminance; and
  - set a luminance of the sub display which the third power is supplied, to a second luminance less than the first luminance.

7. A display device comprising:
- a display including a plurality of sub display which are driven by a driving power;
- a first power module, provided in each of the plurality of sub display, configured to output a first power as a portion of the driving power;
- a second power module, provided in the each of the plurality of sub display, configured to output a second power as a remaining portion of the driving power; and
- a processor configured to:
  - identify whether the first power module is abnormal based on the first power; and
  - output a third power corresponding to the driving power using the second power module by adjusting an initial threshold current amount of the second power module, in an abnormal state of the first power module.

8. The display device of claim 7, wherein the processor is configured to:
- output the first power based on a first overload criterion that corresponds a first threshold current amount, in a normal state of the first power module; and
- output the third power based on a second overload criterion that corresponds a second threshold current amount greater than the first threshold current amount, in the abnormal state of the first power module.

9. The display device of claim 8, wherein the processor is configured to:
- cut off the output of the first power based on an amount of input current of the first power module exceeding the first threshold current amount, in the normal state of the first power module; and
- cut off the output of the first power based on the amount of input current of the first power module exceeding the second threshold current amount, in the abnormal state of the first power module.

10. The display device of claim 7, wherein the processor is configured to:
- set a luminance of the sub display which the first power and the second power are supplied, to a first luminance; and
- set a luminance of the sub display which the third power is supplied, to a second luminance less than the first luminance.

11. A method of operating of a display device comprising a display including a plurality of sub display which are driven by a driving power, comprising:

outputting a first power using a first power module provided in the each of the plurality of sub display, the first power being out as a portion of the driving power; and outputting a second power using a second power module provided in the each of the plurality of sub display, the second power being output as a remaining portion of the driving power, wherein an initial threshold current amount of the first power being output as the portion of the driving power is adjusted to a subsequent threshold current amount that is different from the initial threshold current amount of the first power based on an abnormal state of the second power module, and an initial threshold current amount of the second power being output as the remaining portion of the driving power is adjusted to a subsequent threshold current amount that is different from the initial threshold current amount of the second power based an abnormal state of the first power module.

12. The method of claim 11, further comprising:

identifying whether the second power module is abnormal based on the second power; and outputting a third power corresponding to the driving power, in an abnormal state of the second power module.

13. The method of claim 12, further comprising:

providing the third power after cutting off the output of second power.

14. The method of claim 12, further comprising:

outputting the first power based on a first overload criterion that corresponds a first threshold current amount, in a normal state of the second power module; and outputting the third power based on a second overload criterion that corresponds a second threshold current amount greater than the first threshold current amount, in the abnormal state of the second power module.

15. The method of claim 14, further comprising:

cutting off the output of the first power based on an amount of input current of the first power module exceeding the first threshold current amount, in the normal state of the second power module; and cutting off the output of the first power based on the amount of input current of the first power module exceeding the second threshold current amount, in the abnormal state of the second power module.

16. The method of claim 12, further comprising:

setting a luminance of the sub display which the first power and the second power are supplied, to a first luminance; and setting a luminance of the sub display which the third power is supplied, to a second luminance less than the first luminance.

* * * * *